United States Patent
Badent

(10) Patent No.: US 10,857,590 B2
(45) Date of Patent: Dec. 8, 2020

(54) DEVICE FOR ATTACHING A JOINING ELEMENT TO A PORTION OF A COMPONENT, AND TOOL

(71) Applicant: TOX PRESSOTECHNIK GMBH & CO. KG, Weingarten (DE)

(72) Inventor: Michael Badent, Weingarten (DE)

(73) Assignee: TOX PRESSOTECHNIK GmbH & Co. KG, Weingarten (DE)

( * ) Notice: Subject to any disclaimer, the term of this patent is extended or adjusted under 35 U.S.C. 154(b) by 148 days.

(21) Appl. No.: 15/155,375

(22) Filed: May 16, 2016

(65) Prior Publication Data

US 2016/0303642 A1  Oct. 20, 2016

Related U.S. Application Data

(63) Continuation of application No. PCT/EP2014/073649, filed on Nov. 4, 2014.

(30) Foreign Application Priority Data

Nov. 22, 2013  (DE) .................... 10 2013 019 518

(51) Int. Cl.
*B21J 15/32* (2006.01)
*B21J 15/02* (2006.01)
*B23P 19/00* (2006.01)

(52) U.S. Cl.
CPC ............. *B21J 15/32* (2013.01); *B21J 15/025* (2013.01); *B23P 19/006* (2013.01)

(58) Field of Classification Search
CPC .......... B21J 15/025; B21J 15/02; B21J 15/32; B25C 1/005; B25C 1/00; B25C 1/04; B25C 1/08; B25C 7/00

(Continued)

(56) References Cited

U.S. PATENT DOCUMENTS 1,503,861 A * 8/1924 Stimpson ................. B21J 15/32
                                                           269/254 R
2,244,048 A * 6/1941 Butter ..................... B21J 15/025
                                                           227/149

(Continued)

FOREIGN PATENT DOCUMENTS

DE       102 58 928 A1    7/2004
DE   10 2004 011 846 A1   9/2004

(Continued)

OTHER PUBLICATIONS

International Preliminary Report on Patentability (PCT/EP2014/073649) dated Jun. 2, 2016.

(Continued)

*Primary Examiner* — Orlando E Aviles
*Assistant Examiner* — Seahee Hong
(74) *Attorney, Agent, or Firm* — Burr & Brown, PLLC

(57) ABSTRACT

A device for attaching a joining element to a component portion for a tool comprising a die unit and a punch that is linearly movable on a working axis of the tool from a retracted position on the tool to the die unit and back again, wherein the working axis coincides with a punch longitudinal axis, and wherein the punch, in its forward movement to the die unit, transports in the direction of the component portion a joining element which has been temporarily placed on the device in a holding position. The device includes a positioning portion, in the region of the holding position, which is tailored to a joining element and configured such that the joining element is held with a predefined orientation in such a way in the holding position that a longitudinal axis of the joining element deviates spatially from the working axis of the tool.

9 Claims, 2 Drawing Sheets

(58) Field of Classification Search
USPC .................. 29/243.53; 227/119, 120, 130, 8
See application file for complete search history.

(56) References Cited

U.S. PATENT DOCUMENTS

| | | | | |
|---|---|---|---|---|
| 3,820,705 | A * | 6/1974 | Beals | B25C 1/005 227/113 |
| 4,313,552 | A * | 2/1982 | Maurer | B25C 1/005 227/109 |
| 4,389,012 | A * | 6/1983 | Grikis | B25C 1/005 221/198 |
| 4,593,845 | A * | 6/1986 | Andersson | B25B 23/06 227/112 |
| 5,238,167 | A * | 8/1993 | Howard | B25C 7/00 227/110 |
| 5,437,404 | A * | 8/1995 | Shkolnikov | B25C 1/184 227/109 |
| 5,452,835 | A * | 9/1995 | Shkolnikov | B25C 7/00 227/8 |
| 5,842,625 | A * | 12/1998 | Kimura | B25C 1/003 227/127 |
| 6,209,770 | B1 * | 4/2001 | Perra | B25C 1/005 227/120 |
| 6,216,331 | B1 * | 4/2001 | Muller | B21J 15/32 29/525 |
| 6,374,474 | B1 * | 4/2002 | Rossler | B21J 15/105 29/243.523 |
| 6,394,332 | B2 * | 5/2002 | Akiba | B25C 1/008 227/130 |
| 6,592,015 | B1 * | 7/2003 | Gostylla | B21J 15/025 227/107 |
| 6,783,044 | B2 * | 8/2004 | Perra | B25C 1/008 227/8 |
| 6,789,718 | B2 * | 9/2004 | Canlas | B25C 7/00 227/130 |
| 6,968,939 | B1 * | 11/2005 | Mauer | B21J 15/025 198/468.8 |
| 7,296,721 | B1 * | 11/2007 | Wen | B25C 1/045 227/130 |
| 7,395,953 | B2 * | 7/2008 | Ishizawa | B25C 1/047 227/120 |
| 7,628,304 | B2 * | 12/2009 | Yamamoto | B25C 1/008 227/119 |
| 7,677,426 | B2 * | 3/2010 | Tillinghast | B25C 1/043 227/130 |
| 7,905,378 | B2 * | 3/2011 | Liang | B25C 1/044 227/8 |
| 8,602,284 | B2 * | 12/2013 | Tillinghast | B25C 1/043 227/130 |
| 2004/0050899 | A1 * | 3/2004 | Canlas | B25C 7/00 227/119 |
| 2007/0075113 | A1 * | 4/2007 | Tillinghast | B25C 1/008 227/130 |
| 2007/0095875 | A1 * | 5/2007 | Lamb | B25C 1/043 227/8 |
| 2010/0327038 | A1 * | 12/2010 | Tamura | B25C 1/08 227/9 |
| 2011/0290847 | A1 * | 12/2011 | Drant | B23P 19/003 227/119 |
| 2012/0324690 | A1 | 12/2012 | Faitel | |

FOREIGN PATENT DOCUMENTS

DE 10 2010 024 117 A1 12/2011
DE 197 81 832 B3 8/2012

OTHER PUBLICATIONS

German Search Report (Application No. 10 2013 019 518.7) dated Jul. 24, 2014.
International Search Report and Written Opinion (Application No. PCT/EP2014/073649) dated Feb. 4, 2015.

\* cited by examiner

DEVICE FOR ATTACHING A JOINING ELEMENT TO A PORTION OF A COMPONENT, AND TOOL

CROSS REFERENCE TO RELATED APPLICATIONS

This application is a continuation of International Application No. PCT/EP2014/073649 filed Nov. 4, 2014, which designated the United States, and claims the benefit under 35 USC § 119(a)-(d) of German Application No. 10 2013 019 518.7 filed Nov. 22, 2013, the entireties of which are incorporated herein by reference.

FIELD OF THE INVENTION

The present invention relates to a device for attaching a joining element to a portion of a component and a tool for attaching a joining element to a component portion comprising a die unit and a punch.

BACKGROUND OF THE INVENTION

Devices or tools for attaching joining elements to components are known, for instance devices for riveting tools. With such devices or tools, joining elements, such as, for instance, functional elements or semihollow punch rivets, solid punch rivets or clinch rivets can be machined. Prior to their attachment to the component, the joining elements provided for a joining point on the component are moved with a linearly movable tool punch from a holding position on or in the tool up to the component and attached there under force effect.

SUMMARY OF THE INVENTION

The object of the present invention is to improve devices or tools for attaching a joining element to a component portion with regard to a long service life, in particular, in order to avoid problems caused by dirt contaminations which are resident along the motional path of the joining elements on the or in the device.

The present invention is based on a device for attaching a joining element to a component portion, which device is for a tool for attaching a joining element to a component portion, the tool comprising a die unit and a punch, the latter of which is linearly movable on a working axis of the tool from a retracted position on the tool to the die unit and back again, wherein the working axis coincides with a punch longitudinal axis, and wherein the punch, in its forward movement to the die unit, transports in the direction of the component portion a joining element which has been temporarily placed on the device in a holding position. After the joining process, the punch moves on the working axis out of an extended position back into the retracted position. The punch longitudinal axis is, in particular, a central axis of symmetry of the punch, which axis coincides with the working axis.

The tool additionally comprises a control unit, in particular, having a computer unit, for controlling the operating processes or the drive unit.

The core of the present invention lies in the fact that a positioning portion in the region of the holding position, which positioning portion is tailored to a joining element, is configured such that the joining element is held with a predefined orientation in such a way that in the holding position, a longitudinal axis of the joining element deviates spatially from the working axis. The longitudinal axis of the joining element is, in particular, an axis of symmetry of the joining element. In the case of a substantially externally cylindrical joining element, the longitudinal axis is, for example, a central axis, which forms the center axis of the associated cylinder shape.

Preferably, the working axis coincides with a central center axis or axis of symmetry of the punch.

The joining element is held in the holding position, in particular, in a positionally fixed manner. Generally a joining element is previously conveyed from outside the device or tool, up to the device and into the holding position via a feed channel or the like, for example, pneumatically. Once the holding position is reached, the punch is moved back, so that the region of the holding position is free for the temporary placement of the next joining element in front of the front end side of the punch. In the holding position, which corresponds to a standby position of that joining element which has previously been delivered from outside, the joining element remains until the punch fetches the joining element and pushes it in the direction of the die unit with the component portion supported thereon.

The proposed arrangement is advantageous, in particular, with regard to a minimization of problems arising from dirt contaminations in the region of the holding position and in the course of the subsequent discharge of the joining elements in the device, which is realized by the punch.

The position or orientation of the temporarily placed joining element in the holding position, and thus of the joining element longitudinal axis, deviates according to the present invention from a position or orientation which the joining element subsequently has en route to the component portion when it is pushed ahead of the punch, for example, in a bore of a hold-down clamp of the device or tool. With the inventive deviation of the joining element longitudinal axis from the working axis, the joining element is firstly moved by the punch forcibly out of the holding position until the joining element longitudinal axis corresponds with the working axis or with the punch longitudinal axis. Then the joining element is moved, as in known devices, toward the component portion.

According to the present invention, a forcible offsetting movement of the joining element out of the holding position, which can be regarded as the standby position of the joining element, is therefore firstly established before the joining element is moved onward. The offsetting movement in the course of the discharge from the holding position into the subsequent onward transport position lies in the fact that dirt in the region of the holding position does not impede the discharge of the joining element into the exact onward transport position.

Rather, the offsetting movement is suitable for ensuring that, during operation of the tool, dirt, which over time adheres in the region of the holding position and can never be precluded, can make an impact only insofar as the length of the discharge path of the temporarily placed joining element from the holding position to the onward transport position, which length over time is reduced somewhat in dependence on the dirt. The direction of the discharge movement is generally a different one, for example, transversely in relation to a subsequent pure linear movement in the direction of the die unit. The desired end position of the discharge movement is maintained as before, however, and in particular is not overshot. The deviation of the longitudinal axis of the joining element in the holding position from the working axis determines in the uncontaminated state a maximum size of a dirt buffer, and is tailored such that in practice, even in unfavorable conditions, the holding position is always such that the joining element in the holding position always deviates from the working axis such that the punch which moves up to the joining element shifts the joining element back out of the holding position always in the same direction relative to the working axis.

In order to reach the holding position, each joining element is transported out of a feed line for delivering the individual joining elements into the holding position, moving each joining element beyond the working axis and into the holding position. Each joining element thus firstly passes through a region into which the joining element is subsequently moved back again when transported by the punch. Hence the return movement of the joining element out of the holding position is necessarily established, which is desired. The inventive arrangement comprising a return movement of the joining element out of the holding position is non-existent in known devices or tools.

Hitherto, dirt contaminations in the region of a standby or take-up position of the joining element have led to a situation in which the joining element no longer assumes an ideal position and can therefore jam or tilt when the punch meets the joining element to transport it.

Dirt contaminations are relevant specifically in the region of the holding or standby position, because dirt contamination in the holding or standby position causes a change in the motional direction of the joining element to take place, so that dirt deposits are promoted in the holding position. With each joining element, dirt particles are entrained, which, though the dirt particles are individually comparatively small or tolerable, however, in continuous operation with a rising number of machined joining elements, the dirt particles accumulate in the region of the holding position, or at least in part deposit themselves or remain stuck on device portions adjacent to the holding position.

In known devices or tools, the joining elements are brought into a holding position, so that, in the uncontaminated state of the tool, a delivered joining element is positioned exactly beneath the retracted punch, for example, in alignment thereto or symmetrical to the punch longitudinal axis. This procedure works in continuous operation as long as no dirt contaminations occur, however, dirt contaminations are in practice always present.

Hitherto, this has led to a situation in which the longitudinal axes of the respective joining elements are pressed over time by a developing dirt layer into a fetching position which deviates from the actual or, in the uncontaminated state, exact holding position. Hence, the position of a temporarily placed joining element is displaced over time counter to the direction from which the joining elements are conveyed into the holding position. This leads inevitably to a situation in which, depending on the degree of dirt contamination in the region of the holding position, a time is reached when a joining element is in a standby position which, due to the dirt layer, is offset from the working axis in the direction of the feed line or laterally with respect to the ideal or exact holding position in the uncontaminated state, and in which the joining element projects with an upper or lower marginal region into the supply line which is present transversely to the motional path of the punch or butts mechanically against other fixed tool portions. If now the retracted punch is moved in the direction of the joining element in order to transport this joining element, the joining element bangs against fixed tool portions. This leads to problems and/or damage to the tool, in particular to a drive unit for the punch, to the punch itself, to the joining element and/or to adjoining tool portions. This also means that joining elements which are not correctly attached to the component portion are conceivable.

With the device according to the present invention, particularly advantageously, a critical away movement in the holding position, and thus a possible tilting or twisting of the joining element during the onward movement of the joining element out of the holding position is reliably avoided. In particular, as a result of the holding position with the deviation of the longitudinal axis of the joining element from the working axis, a spatial region for dirt contaminations is provided, so that, due to build-ups of dirt particles, although the joining element deviates from a positioning in the holding position in the uncontaminated state, this deviation is made to a tolerable extent, which is determined by the extent of deviation of the joining element longitudinal axis from the working axis, so that, when the joining element is moved onward from the holding position by the punch, both without and with dirt contaminations in the region of the holding position, the joining element does not tilt or jam.

In particular, the deviation of the longitudinal axis of the joining element from the working axis serves to ensure that the joining element is transported always in a functionally correct manner by the forward moving punch or punch moving in the direction of the die unit. The relative movement of the joining element out of the holding position into a position for a linear joining element movement along the working axis advantageously always takes place both in the uncontaminated and in the, in practice, always likely contaminated state of the tool. In both cases, a relative movement of the joining element from the holding position takes place in the direction from which the joining element has been delivered via the supply line. This return movement takes place into a position in which the joining element is moved completely out of the holding position until the joining element is subsequently moved only linearly along the working axis by the punch. The return movement of the joining element out of the holding position is made in a predefinable or defined manner. In the return movement, the joining element can be moved transversely, obliquely or along a trajectory relative to the working axis, and/or be pivoted or tilted about a point.

As a result of the deviation of the longitudinal axis from the working axis or the thereby established misalignment of these axes, with the forward moving direction of the punch for the transportation of the joining element, also a slight relative movement of the joining element in relation to an end face of the punch takes place at its free end that contacts the joining element.

The joining element is moved in the region of its joining element head, in the uncontaminated state in the holding position, out of, in particular, a partially form-fitting location in the holding position by the punch and moved in the direction of the die unit or onto a temporarily placed component and attached there. The joining element can be held in a positionally fixed manner in the holding position, for example by suction on the basis of a negative pressure applied to the joining element, until the punch advancing out of the retracted position transports the joining element by pushing the joining element ahead of it.

Furthermore, it is advantageous that the positioning portion comprises a bearing contour tailored to an external shape of the joining element, wherein the joining element is held in the holding position, by fitting contact against the bearing contour, in an orientation predefined by the shape of the bearing contour. The bearing contact of the joining element against the bearing contour of the positioning portion is realized in a snug or, where appropriate, form-fitting manner. The bearing contour can be tailored, for example, to correspond to that part of an external shape of the joining element which comes into contact with the bearing contour. Where appropriate, in the region of the bearing contour, a clearance or an opening can be present, in particular, an opening of a bore, extending up to the bearing contour, of a suction line for holding the joining element. With the tailor-made bearing contour, each correspondingly shaped joining element delivered via, for example, a supply line is positionable in the holding position in a defined and reproducible or identically oriented manner.

Further, the positioning means are designed such that the longitudinal axis of the joining element in the holding position is offset such that it is parallelly oriented to the working axis. The longitudinal axis of the joining element is hence, in particular, radially offset, or offset with a lateral offset from the working axis or beyond the working axis. The longitudinal axis of the joining element is offset away from the working axis, in particular, in the direction of movement of the joining element delivered, for example, via a supply line. The longitudinal axis of the joining element advantageously lies, in the direction of the movement of the delivered joining element, behind the working axis. The working axis is hence on the path of the joining element when conveyed into the holding position, for example by an air stream, and is passed through by the joining element, which moves beyond the working axis in order to make its way into the holding position. From this follows that the joining element is moved back somewhat out of the holding position upon transportation by the punch counter to the motional direction in the course of delivery into the holding position. Following the discharge from the holding position, the joining element is moved onward by the punch in the direction of the die unit, whereupon the joining element longitudinal axis then coincides with the working axis.

It is advantageous, moreover, that the positioning means are configured such that the longitudinal axis of the joining element in the holding position is offset in an obliquely oriented manner from the working axis. When the joining element is moved out of the holding position, the joining element is then, where appropriate, pivoted or tilted somewhat, or where appropriate overlaid by a linear movement component of the joining element. Hence the joining element is brought, for transport to the component portion, into an orientation in which the joining element longitudinal axis coincides with the working axis.

Advantageously, for a predefinedly guided movement of the joining element out of the holding position, guide means are configured in the region of the holding position such that the joining element is movable out of the holding position until the longitudinal axis of the joining element coincides with the working axis. The out movement is effected by a movement of the punch. For instance, an oblique or curved guideway can be present, along which external portions of the joining element abuttingly slide when the joining element is pushed out of the holding position by the punch. The guideway can advantageously form a part of the bearing contour.

An advantageous modification of the subject of the present invention is distinguished by the fact that the bearing contour is configured in the region of a movement channel for the punch. The punch is generally surrounded on the outside by a device portion or tool portion. In an extended position of the punch, this is located in a movement channel or a hollow channel of a tool part present around the outside of the punch. The component surrounding the movement channel fulfills, for example, the function of a hold-down clamp for pressing down, on the punch side, the component portion which during the joining process is supported on a supporting side of the die unit.

Within the movement channel, an axial and partially peripheral region of an inner side of the movement channel, which region is adjacent to an end side of the retracted punch, can advantageously form the bearing contour. For instance, a region of the inner side of the movement channel can portray a positive mold or negative mold of a part of the external shape of the joining element, or can be at least approximately modeled thereon. In a joining process, the joining element temporarily placed in the bearing contour in the holding position has to be shifted by the punch advantageously only by a comparatively short distance in the direction of the working axis in order to bring the joining element into the center of the movement channel.

In some embodiments, the joining element, when shifted from the holding position into the central position in the movement channel of the punch, is pneumatically pressurized, so that the joining element is pressed permanently and in a definedly oriented manner against the bearing contour or against portions of the guide means or is sucked against these. Hence the joining element remains always in defined orientation, including during the onward movement out of the holding position by the punch. This is advantageous, in particular, because the joining element is not inadvertently shifted back or tilted too far transversely to the working axis.

It is further advantageous that the bearing contour is present opposite to a feed opening for feeding a joining element into the holding position. Generally, a plurality of joining elements are temporarily placed in a holding position outside of the device or tool and are conveyed via a supply line or the like to the device or, pass through the feed opening into the holding position. Upon reaching the feed opening, the joining element is oriented at least approximately as subsequently oriented in the holding position. Advantageously, if the bearing contour is opposite to the feed opening, then the joining element is conveyed in a straight line, hereby bridging the movement channel of the punch before the joining element reaches the bearing contour. Where appropriate, the bearing contour serves as a mechanical stop for the incoming joining element. For example, the sucked-up joining element remains in the holding position until it is transported and moved onward by the punch.

It is additionally advantageous that the bearing contour has at least in some regions a concave shape which is tailored to an external shape of the joining element. Frequently the joining elements have, in particular, a shank region having an externally convex, cylindrical or elliptical shape. In order that the joining element is correctly oriented in the bearing contour and can be held securely in place, the bearing contour is correspondingly designed for a full-faced bearing contact with an outer side of the joining element.

It is also advantageous that the bearing contour has a portion running convexly in the direction of the working axis, which portion is tailored to a shape of a fillet present on the joining element, in the region of a joining element head. In the holding position of the joining element, the convex shape or the convex portion of the bearing contour can come full-facedly into contact against the fillet of the joining element head.

Finally, it is advantageous that a connection to a vacuum line is configured in the region of the bearing contour. Thus at the joining element, which is temporarily placed in the holding position, a negative pressure can be established in the region of the bearing contour. With the negative pressure, the temporarily placed joining element can be correctly oriented in the holding position and held suctioned in a positionally fixed manner. The use of negative pressure as the holding mechanism is advantageous, since this is possible without mechanically movable parts in the region of the holding position. Thus the device according to the present invention is improved in relation to an arrangement in which otherwise, for the holding of the joining element in the holding position, mechanical holding means are necessary and pose a collision risk for the joining element with the forward and backward moving punch.

The present invention additionally relates to a tool for attaching a joining element to a component portion, the tool comprising a die unit and a punch, wherein a device according to one of the aforementioned variants is present.

BRIEF DESCRIPTION OF THE DRAWINGS

Further features and advantages of the invention are explained in greater detail on the basis of a schematically represented illustrative embodiment of a tool according to the invention.

DETAILED DESCRIPTION OF THE INVENTION

Figure 1:
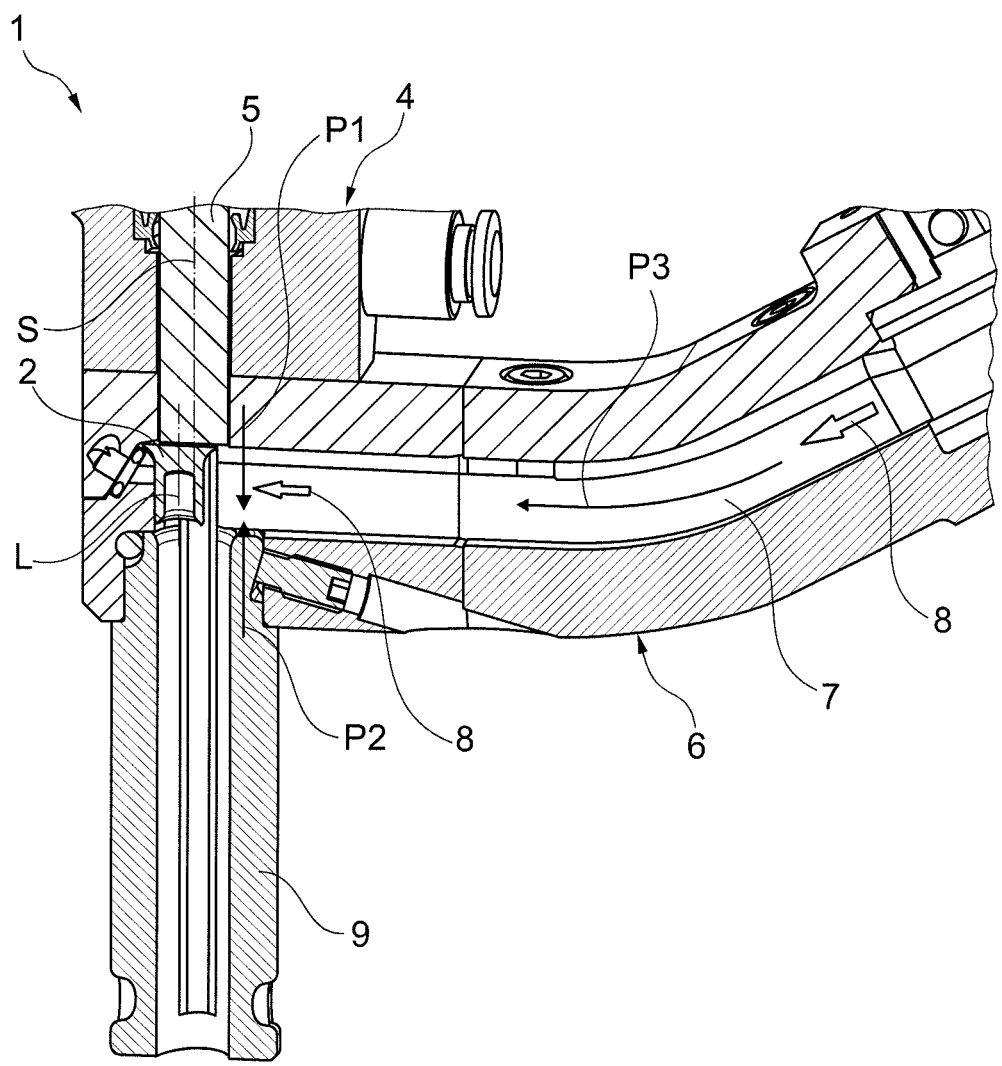
FIG. 1 shows in section a part of a tool according to the invention with a supply line connecting thereto.
Figure 2:
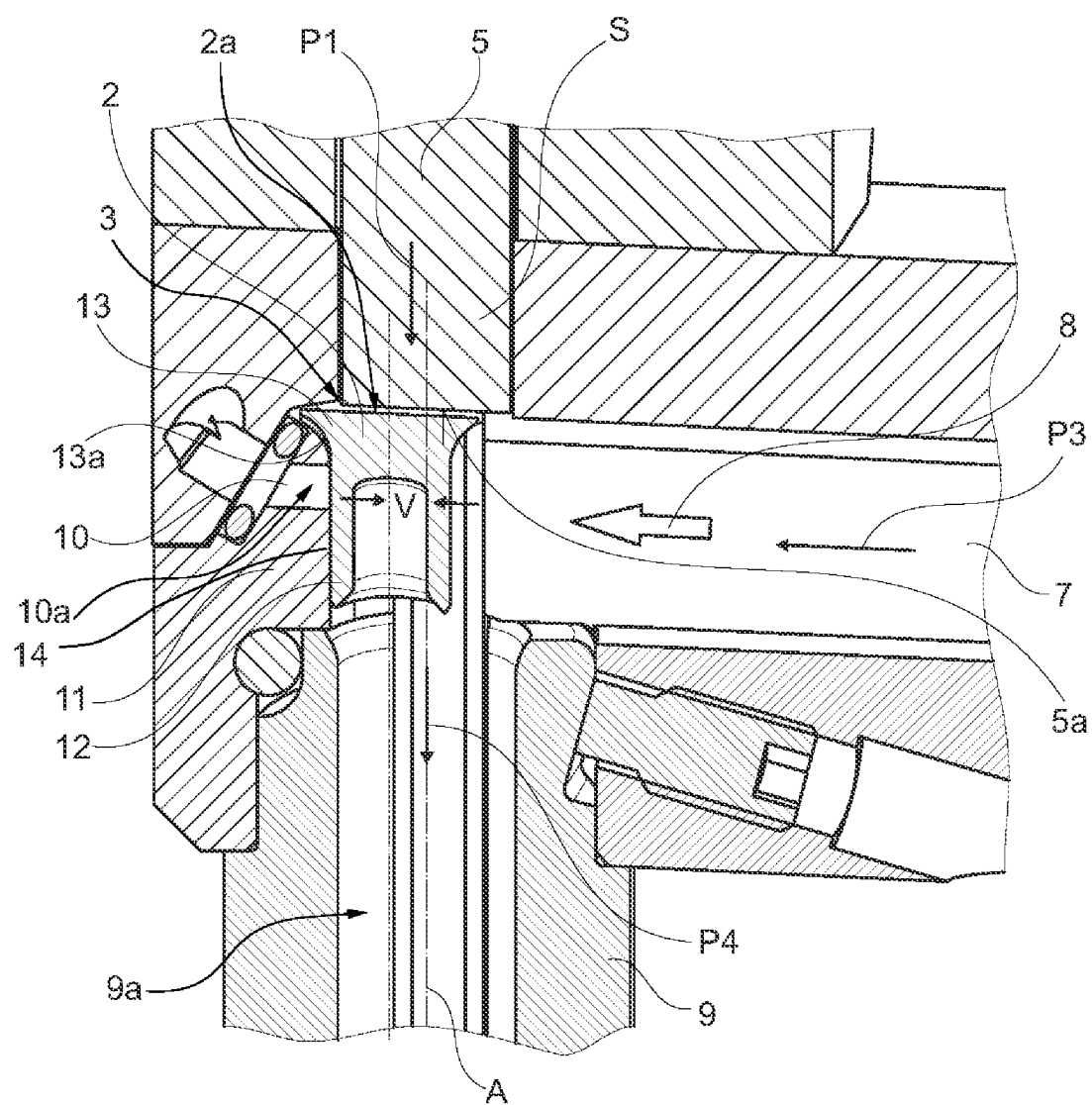
FIG. 2 shows an enlarged detail from FIG. 1.

In FIGS. 1 and 2, a part of a tool according to the present invention, configured as a riveting tool 1, for machining joining elements with a joining element feed is shown in sectioned and schematized representation. A joining element which is individually temporarily placed in the riveting tool 1 is represented by way of example as a semihollow punch rivet 2, which is machinable by the riveting tool 1. The semihollow punch rivet 2 is held positionally fixed in a standby or holding position 3 in the riveting tool 1. The semihollow punch rivet tool 1 serves to insert the semihollow punch rivet 2 in, for example, two or more material layers (not shown) to be connected to one another, which material layers consist of a metallic or other material.

For the positioning of the semihollow punch rivet 2 in the holding position 3 on the riveting tool 1, the semihollow punch rivet 2 is conveyed from a store, remote from the riveting tool 1, for a multiplicity of semihollow punch rivets via, for example, a feed tube (not visible) and, on the tool side, a feed 6 adjoining thereto, having a feed channel 7 for the semihollow punch rivet in the direction P3 into a rivet setting head 4 of the riveting tool 1. A punch of the riveting tool 1, which punch is movable linearly to and fro according to the arrows P1 and P2 by means of a drive unit of the riveting tool 1 and is configured as a rivet setting pin 5, is shown in FIGS. 1 and 2 in a position retracted in the direction P2. From this position, the rivet setting pin 5 transports for each joining process respectively an individual semihollow punch rivet out of the holding position 3 shown for the semihollow punch rivet 2 in the direction P4, in that a flat plane surface or end face 5a of the rivet setting pin 5 advancing in the direction P1 acts on a head-side, generally likewise flat end side 2a of the semihollow punch rivet 2 and advances the semihollow punch rivet 2 in the direction P1. As a result of the action of the end face 5a on the end side 2a, the semihollow punch rivet 2, should this not be accurately oriented, is altered somewhat in terms of its orientation or brought exactly into the desired orientation. The end face 5a and the end side 2a then lie parallel to each other.

The semihollow punch rivet 2 advanced by the rivet setting pin 5 is then pressed in a joining process, for example, into a sheet stack and the sheets brought into an at least positively connected state. The semihollow punch rivet 2 punches through at least an upper sheet and is wideningly deformed in another underlying sheet and firmly anchored in the sheets. The sheets too are here partially deformed in the formed joining point.

The sectional representations of the riveting tool 1 according to FIGS. 1 and 2 derive from a section along the longitudinal axis of the rivet setting pin 5.

In the state extended in the direction of a die unit (not shown) of the riveting tool 1, the rivet setting pin 5 is surrounded on the outside peripherally by a hold-down clamp configured as a hold-down nose 9. The material layers concerned, such as, for example, a sheet stack, rest during the joining process with a bottom side on the die unit, wherein the hold-down nose 9 fixes the sheet stack against the die unit in a press-down manner from above or on the punch side.

The semihollow punch rivet 2 is led up from the store into the rivet setting head 4 not in the axial direction or in the direction of the longitudinal axis L of the semihollow punch rivet 2, but in the transverse direction to the longitudinal axis L of the semihollow punch rivet 2, by the feed 6. Thus the semihollow punch rivet 2 can advantageously be shot directly under the rivet setting pin 5, wherein an otherwise necessary mechanism can be eliminated from the device, for example, a pusher mechanism a which rotates the semihollow punch rivet 2 through 90 angular degrees before the punch pushes the semihollow punch rivet 2 onward in the direction P4 according to the orientation shown in FIG. 2, with a rivet bottom side to the fore.

The semihollow punch rivet 2 is conveyed by means of an air stream 8 in the direction P3 and is injected directly under the rivet setting pin 5 or its front or end-side flat end face 5a and is held there positionally fixed, in oriented arrangement, in the holding position 3, as is shown by FIGS. 1 and 2. The semihollow punch rivet 2 is here secured by a pressure difference acting, in accordance with the air stream 8, on the outside of the semihollow punch rivet 2. In order that the semihollow punch rivet 2 in the holding position 3 detects the pressure difference, an evacuation line for the air is present, for example on a side of the held semihollow punch rivet 2 that is to the rear of the inflowing air stream 8. The semihollow punch rivet 2 is thus pressed into the holding position 3 and remains there as long as the air stream 8 or a pressure difference exists.

In the present illustrative embodiment there is provided a low pressure bore 10, in which, in relation to a reference pressure, such as, for example, ambient or atmospheric pressure, a negative pressure or low pressure prevails. When the semihollow punch rivet 2 reaches the holding position 3 and closes off an opening 10a of the low pressure bore 10, the semihollow punch rivet 2, due to the negative pressure in the low pressure bore 10, is sucked up to the opening 10a and remains in the holding position 3. With the negative pressure in the low pressure bore 10, on the one hand, and a thereto higher, for example ambient pressure in the remaining region around the semihollow punch rivet 2, a pressure difference takes effect at the semihollow punch rivet 2, which pressure difference secures the semihollow punch rivet 2 in the holding position. The negative pressure in the low pressure bore 10 can be established, for example, by an extraction or vacuum arrangement, which extracts air from the low pressure bore 10.

The location of the semihollow punch rivet 2 in the rivet setting head 4 is, according to the present invention, always clear, in particular, in the transfer of its motional direction from a transverse motional direction P3 to beneath the rivet setting pin 5 to an axial motional direction P4 in which the rivet setting pin 5 pushes the semihollow punch rivet 2 through the hold-down nose 9. Were the semihollow punch rivet 2 to be tilted or twisted, even if only slightly, in the riveting tool 1 or in the rivet setting head 4, this tilt or twist of the semihollow punch rivet 2 would in most cases lead to damage to or destruction of components of the rivet setting head 4.

The transfer from the lateral, for example, horizontal feed of the semihollow punch rivet 2 according to P3 into the onward movement of the semihollow punch rivet 2 is realized by the rivet setting pin 5 and supported by a bearing contour 14 in a continuous path without interfering contours and/or without component offsets. As a result, a continuous, low-wear transport of the semihollow punch rivet 2 in the riveting tool 1 is ensured, in particular, into the holding position 3 and back out of this holding position 3.

The holding force on the semihollow punch rivet 2 by virtue of the negative pressure p in force in the holding position 3 departs as soon as the semihollow punch rivet 2 is pressed minimally or slightly out of the holding position 3 by action of the down-moving rivet setting pin 5. Holding portions on the rivet setting head 4 which come into contact against the semihollow punch rivet 2 then take over the positioning or guidance of the semihollow punch rivet 2. Here the semihollow punch rivet 2 is always moved in a definedly oriented manner.

The semihollow punch rivet 2 which is fired into the rivet setting head 4 according to P3 transversely to the motional direction P1, P2 of the rivet setting pin 5 meets the bearing contour 14 of a stop 11. The bearing contour 14 is configured on the stop 11 as a wall portion opposite to the feed channel 7, so that the semihollow punch rivet 2 arriving in the direction P3 can fit snuggly against the bearing contour 14. The bearing contour 14 is present on a part, adjacent to the withdrawn rivet setting pin 5, of a movement channel for the rivet setting pin 5 in the region of the holding position 3. The bearing contour 14 is configured tailored to correspond to a region of an external shape of the semihollow punch rivet 2. Hence the semihollow punch rivet 2 is fittingly pressed or sucked up against the bearing contour 14, wherein the semihollow punch rivet 2 is held by the bearing contour 14 automatically or in a definedly predefined orientation or positioning. In the shown illustrative embodiment in FIG. 2, the bearing contour 14 is here such that the longitudinal axis of the semihollow punch rivet 2 is offset parallel to the longitudinal axis S of the rivet setting pin 5 in the direction P3 of the incoming semihollow punch rivet 2 beyond a working axis A or beyond the middle of the punch channel 9a. The working axis A defines the motional path of the rivet setting pin 5 within or along the hold-down nose 9 and runs centrally to the cylindrical inner or hollow volume of the hold-down nose 9 or coincides with the longitudinal axis S of the rivet setting pin 5. In the holding position 3, the semihollow punch rivet 2 has a radial or lateral offset V from the longitudinal axis S of the rivet setting pin 5 or from the working axis A. The offset V advantageously amounts to, for example, around one-third of the diameter of an externally cylindrical shank 12 of the semihollow punch rivet 2.

The stop 11 is located directly below the rivet setting pin 5 in its retracted position, according to FIGS. 1 and 2, fully withdrawn in the direction P2. The shape of the bearing contour 14 of the stop 11 is shell-like, with a radius which roughly corresponds to an outer radius of the shank 12 of the semihollow punch rivet 2, which outer radius is equal for all differently long semihollow punch rivets machinable with the riveting tool 1. The bearing contour 14 or the stop 11 is drilled through and the low pressure bore 10 formed thereby is subjected to negative pressure. As a result, the semihollow punch rivet 2 or its shank 12 is sucked against the bearing contour 14 and the semihollow punch rivet 2 is held in the holding position 3. The low pressure bore 10 runs through the stop 11 or the rivet setting head 4 at a suitable place, in particular, in an interfering contour uncritical region of the riveting tool 1, at which a sensor and/or a pressure switch can detect, by measuring the negative pressure or low pressure in the low pressure bore 10, whether a semihollow punch rivet is positioned under the rivet setting pin 5 or not. Hence, by low pressure combined with the holding function, a presence check for a held semihollow punch rivet 2 is provided. In this way, a multiplicity, for instance several tens of thousands, of semihollow punch rivets can be treated such that the semihollow punch rivet 2 is reliably sucked up in all spatial positions of the rivet setting head 4. Furthermore, with the negative pressure it is achieved that the low pressure bore 10 is not, or only to a tolerable extent, clogged up by dirt.

Moreover, an air filter, with which the sensor is kept free of particles, can be provided in the low pressure bore 10. The dirt contamination can originate, in particular as a result of, for example, abrasion, from the feed tube or the feed 6, or a coating of the semihollow punch rivet 2. The sensor, for example a pressure sensor, can additionally check in a further function whether the air filter is blocked.

In the holding position 3, the semihollow punch rivet 2 is found with a rivet head 13, which on the outside merges via a concave fillet 13a into the shank 12, in an at least almost form-fitting contact against the correspondingly convexly shaped portion of the bearing contour 14. Along this, the semihollow punch rivet 2 can in the first movement segment be shifted out of the holding position 3 by the rivet setting pin 5 in the direction P4 and, at the same time, somewhat counter to the direction P3, until the longitudinal axis L and the longitudinal axis S of the punch correspond. From there, the semihollow punch rivet 2 is pushed linearly onward by the rivet setting pin 5 in the direction P4.

In order to ensure that the semihollow punch rivet 2 can be moved forward out of the holding position 3 by the advancing rivet setting pin 5, the longitudinal axis of the stop 11, and thus the wall forming the bearing contour 14, in relation to the punch longitudinal axis S, is offset slightly or by the offset V in the direction P3, so that the semihollow punch rivet 2 arriving with the air stream 8 flies somewhat further or over the middle of the hollow punch channel 9a in the hold-down nose 9. Hence the semihollow punch rivet 2 is moved, by the rivet setting pin 5 that advances according to P1, slightly relatively counter to the direction P3, in relation to the end face 5a of the rivet setting pin 5, i.e. somewhat back in the direction of the feed channel 7. Once the rivet head 13 has moved with its fillet 13a out of its at least almost form-fitting location on a portion of the bearing contour 14 that has approximated correspondingly to the shape of the fillet 13a, it is led onward in the hold-down nose 9 by the cylindrical wall of the punch channel 9a. As a result of the advance of the rivet setting pin 5 and the semihollow punch rivet 2 is thus moved automatically in a controlled manner from its form-fitting location out of the holding position 3, without a mechanical lever or a catch, for example, having to be activated.

With the inventive arrangement, the semihollow punch rivet 2 is securely held in all spatial positional locations of the rivet setting head 4, in particular including in an overhead location of the rivet setting head 4.

REFERENCE SYMBOL LIST

1 riveting tool
2 semihollow punch rivet
2a end side
3 holding position
4 rivet setting head
5 rivet setting pin
5a end face
6 feed
7 feed channel
8 air stream
9 hold-down nose
9a punch channel
10 low pressure bore
10a opening
11 stop
12 shank
13 rivet head
13a fillet
14 bearing contour

The invention claimed is:

1. A riveting tool for attaching a joining element to a component portion, the riveting tool comprising:
  a punch that is linearly movable on a working axis of the riveting tool from a retracted position on the riveting tool toward an unretracted position and back again, wherein the working axis coincides with a punch longitudinal axis, and wherein the punch, in a forward movement toward the unretracted position, transports the joining element from a holding position on the riveting tool toward the component portion; and
  a stationary positioning portion in the region of the holding position that does not move laterally with respect to the punch longitudinal axis, which receives and retains the joining element, and which has a shape configured to hold the joining element with a predefined orientation in the holding position such that a longitudinal axis of the joining element deviates spatially from the working axis of the riveting tool, wherein the stationary positioning portion comprises a bearing contour, having the shape configured to hold the joining element that matches an external shape of the joining element, such that an external shape of the joining element fits against the bearing contour and is held in the holding position in the predefined orientation dictated by the shape of the bearing contour, and
  wherein the bearing contour has a rounded portion running convexly in the direction of the working axis of the riveting tool, wherein the rounded portion running convexly is located at an uppermost end of the bearing contour.

2. The riveting tool as claimed in claim 1, wherein in the stationary positioning portion, the longitudinal axis of the joining element in the holding position is offset from and parallelly oriented with respect to the working axis of the riveting tool.

3. The riveting tool as claimed in claim 1, wherein in the stationary positioning portion, the longitudinal axis of the joining element in the holding position is obliquely offset with respect to the working axis of the riveting tool.

4. The riveting tool as claimed in claim 1, further comprising guide means, for providing guided movement of the joining element out of the holding position, located in the region of the holding position, whereby the joining element is movable out of the holding position until the longitudinal axis of the joining element coincides with the working axis of the riveting tool.

5. The riveting tool as claimed in claim 1, wherein the bearing contour is located in a region of a movement channel for the punch.

6. The riveting tool as claimed in claim 1, wherein the bearing contour is located in a position opposite to a feed opening for feeding the joining element into the holding position.

7. The riveting tool as claimed in claim 1, wherein at least some regions of the bearing contour have a concave shape.

8. The riveting tool as claimed in claim 1, further comprising a vacuum line connected in a region of the bearing contour.

9. The riveting tool as claimed in claim 1, wherein the shape of the bearing contour has a radius.

* * * * *